(12) United States Patent
Roper et al.

(10) Patent No.: US 6,986,100 B1
(45) Date of Patent: Jan. 10, 2006

(54) NORMALIZED ROTATION ON A WEB SITE OF DISPLAY ITEMS FROM MULTIPLE SOURCES

(75) Inventors: John D. Roper, Redmond, WA (US); Steven D. Copson, Seattle, WA (US); Daniel B. Cook, Seattle, WA (US); Peter H. Brussard, Seattle, WA (US); Mark Ugar, Seattle, WA (US); Arnold N. Blinn, Bellevue, WA (US); Kathryn L. Sparr, Seattle, WA (US); John A. Dunning, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 09/676,364

(22) Filed: Sep. 29, 2000

(51) Int. Cl.
*G06F 17/24* (2006.01)
*G06F 17/27* (2006.01)

(52) U.S. Cl. .................... 715/511; 715/513; 715/530; 715/539; 715/540; 715/908; 705/14

(58) Field of Classification Search ............... 715/511, 715/513, 530, 539, 540, 908; 205/14
See application file for complete search history.

(56) References Cited

U.S. PATENT DOCUMENTS

| | | | |
|---|---|---|---|
| 5,959,623 A * | 9/1999 | van Hoff et al. ............ 345/719 |
| 6,128,663 A * | 10/2000 | Thomas ...................... 709/228 |
| 6,144,944 A * | 11/2000 | Kurtzman, II et al. ........ 705/14 |
| 6,237,022 B1 * | 5/2001 | Bruck et al. ................ 709/201 |
| 6,385,592 B1 * | 5/2002 | Angles et al. ................ 705/14 |
| 6,604,085 B1 * | 8/2003 | Kolls .......................... 705/14 |
| 6,654,725 B1 * | 11/2003 | Langheinrich et al. ........ 705/14 |
| 2001/0032126 A1 * | 10/2001 | Macartney-Filgate et al. ................ 705/14 |
| 2001/0034643 A1 * | 10/2001 | Acres .......................... 705/14 |
| 2002/0010753 A1 * | 1/2002 | Matsuoka et al. .......... 709/217 |
| 2002/0013174 A1 * | 1/2002 | Murata ........................ 463/42 |
| 2002/0077889 A1 * | 6/2002 | Kolls .......................... 705/14 |

OTHER PUBLICATIONS

BannerServer.com, Banner Server Solutions, version 3.4, Jun. 21, 2000, <http://web.archive.org/web/20000621124729/http://www.bannerserver.com/>.*

* cited by examiner

*Primary Examiner*—Heather R. Herndon
*Assistant Examiner*—Joshua D Campbell
(74) *Attorney, Agent, or Firm*—Woodcock Washburn LLP (57) ABSTRACT

A method for balancing the allocation of available display slots on a Web page among a plurality of different sources of display items comprises (a) defining for each source a set of candidate items to be displayed, (b) selecting items from a pool of all candidate sets, in a manner that normalizes the probability that the items of any one candidate set will be selected in relation to the items of the other candidate sets, and (c) inserting the selected items into the available display slots of the Web page.

24 Claims, 11 Drawing Sheets

NORMALIZED ROTATION ON A WEB SITE OF DISPLAY ITEMS FROM MULTIPLE SOURCES

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention relates to the display of items on a Web page, and more particularly, to methods for balancing the allocation of display slots on a Web page among a number of different sources of display items.

BACKGROUND

The Internet comprises a vast number of computers and computer networks that are interconnected through communication links. The interconnected computers exchange information using various services, such as electronic mail, Gopher, and the World Wide Web ("WWW" or "the Web"). The Web allows a server computer system (i.e., Web server or Web site) to send so-called Web pages of information to a remote client computer system. The remote client computer system can then display the Web pages. Each resource (e.g., computer or Web page) of the Web is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a Web browser. A Web browser is a special-purpose application program that effects the requesting of Web pages and the displaying of Web pages.

Web pages are typically defined using the HyperText Markup Language ("HTML"). HTML provides a standard set of tags that define how a Web page is to be displayed. When a user indicates to a Web browser to display a Web page, the Web browser sends a request to the server computer system to transfer to the client computer system an HTML document that defines the Web page. When the requested HTML document is received by the client computer system, the Web browser displays the Web page as defined by the HTML document.

A Web page typically comprises one or more display items, such as text, graphics, animations, videos, applets, controls, pictures, logos, photographs, images, and the like. A given Web page can comprise a single, static file containing all of the display items and the structural encoding for displaying them (e.g., HTML code), or alternatively, a given Web page can be generated dynamically from a definition file or data structure that identifies the display items and the structural encoding necessary to assemble the Web page for sending to a requesting client browser. A location on a Web page at which a display item is displayed may be referred to as a display slot.

A Web site that is required to display on a Web page a selected number of display items received from multiple sources, often must attempt to fairly allocate the available display space among the various sources so as not to favor display items from any one source. For example, a Web site that provides online merchandizing of products for sale (product offers) from a variety of merchants will often build Web pages that display a selected number of product offers from multiple merchants in a given product category. For example, a page may require the display of only offers for flowers on a "flower offers" page. The Web page may be updated periodically to display a new mix of offers from those merchants. Typically, the number of display slots on the Web page will be limited, and the number of product offers from each merchant in that product category may be much greater than the number of available display slots on the page. Additionally, some merchants may have a much greater number of product offerings in a given product category than other merchants, and some less. A process that merely randomly selects offers from the pool of all merchant offers until the display slots on a page are filled will result in unfair treatment of smaller merchants, as the likelihood of a given merchant's offers being selected for display will be greater for those merchants that have the most product offerings in the product category. Accordingly, there is a need for methods for balancing the allocation of available display slots on a page among a plurality of different sources of display items. The present invention satisfies this need.

SUMMARY

The present invention is directed to methods for balancing the allocation of available display slots on a page among a plurality of different sources of display items, by normalizing the probability that the display items from any given source will be selected for display on that page. In the context of a Web site that provides online merchandizing of products from multiple merchants, wherein the number of product offerings in a given product category may vary widely from merchant to merchant, the present invention ensures a balanced allocation of display slots on a Web page among the different merchants.

The method of the present invention may comprise (a) defining for each source a set of candidate items to be displayed on the Web page, (b) weighting the display items in each set of candidate items to normalize the probability that items from any one candidate set will be selected from the pool of all candidate sets, thereby providing a normalized pool of candidate sets, (c) randomly selecting items from the normalized pool of candidate sets, and (d) inserting the selected items into the Web page.

Alternatively, the method of the present invention may comprises (a) defining for each source a set of candidate items to be displayed on the Web page, (b) randomly selecting one of the candidate sets, (c) randomly selecting one item from the selected candidate set, (d) reducing a count of the display items of the selected candidate set by one and removing that candidate set from further consideration when the count reaches zero; and (e) repeating (b) through (d) until a desired number of display items have been selected for insertion into the Web page. The method may also allow the different sources of display items to provide a degree of weighting to the selection of items from their respective candidate sets without affecting the balancing of display slots between the different sources.

Other features of the invention include (i) incorporating the above methods into a system in which there are different levels of source participation, wherein sources at higher levels receive preference over sources at lower levels in the allocation of display slots, (ii) defining subsets of display items within a candidate set and providing preference to some subsets relative to others, and (iii) the handling of situations in which there are not enough items to fill the available display slots on a given page.

Additional features and advantages of the present invention will become evident hereinafter.

BRIEF DESCRIPTION OF THE DRAWINGS

The foregoing summary, as well as the following detailed description of the invention, is better understood when read in conjunction with the appended drawings. For the purpose of illustrating the invention, various embodiments are shown in the drawings, it being understood, however, that the invention is not limited to the specific methods and instrumentalities disclosed. In the drawings.

DETAILED DESCRIPTION OF THE INVENTION

Figure 1:
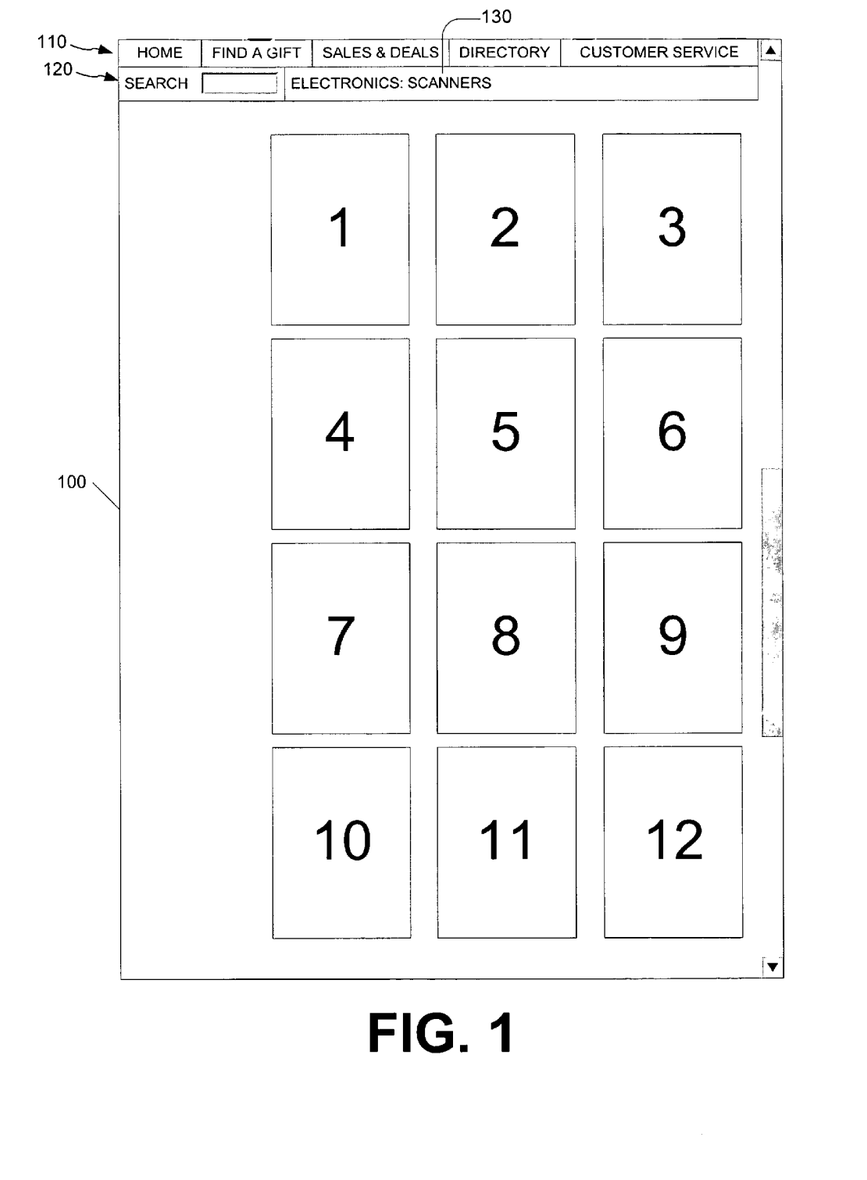
FIG. 1 shows an exemplary Web page having a plurality of display slots, to which the methods of the present invention may be applied.

Referring to the drawings, wherein like numerals represent like elements throughout, FIG. 1 shows an exemplary Web page 100 to which the method of the present invention may be applied. The Web page 100 has a plurality of display slots, indicated diagrammatically as slots 1–12, at which items may be displayed on the page. Typically, the number of display slots on a page will be limited. In the example shown, there are twelve available display slots. The arrangement and location of display slots on the Web page may be pre-defined, by for example a Web page template, or may be determined dynamically during Web page generation. As used herein and in the claims, the term "display slot" means a location within a Web page at which a display item may be located. The term "display item" means any text, graphics, animations, videos, applets, controls, pictures, logos, photographs, images, and the like, or any combinations thereof, to be inserted at a given display slot of a Web page.

By way of example only, the Web page 100 may be part of an exemplary Web site that provides online merchandising of products from a variety of merchants. In this example, the Web page 100 may be used to display a selected number of product offers from multiple—merchants in a given product category. For example, this particular page may be used to display offers for digital "scanners," which may be considered a subcategory of "electronics." Each product offer represents one display item, and each merchant represents a different source of display items.

The exemplary Web page 100 provides a menu 110 of links to other features of the Web site, as well as a search capability shown at 120. The particular category of offers being displayed (e.g., "ELECTRONICS: SCANNERS") may be shown at 130. Each offer (i.e., display item) from a given merchant will occupy one of the twelve display slots shown on the page 100. The Web page 100 may be updated periodically to display a new mix of offers from the various merchants, or may be updated every time a web browser requests the web page. The Web page 100 may be created as a static file containing all of the display items and the structural encoding for displaying them at selected display slots, or alternatively, a given Web page can be generated dynamically from a definition file or data structure that identifies the display items and the structural encoding necessary to assemble the Web page and to locate the display items in the appropriate display slots.

Figure 2:
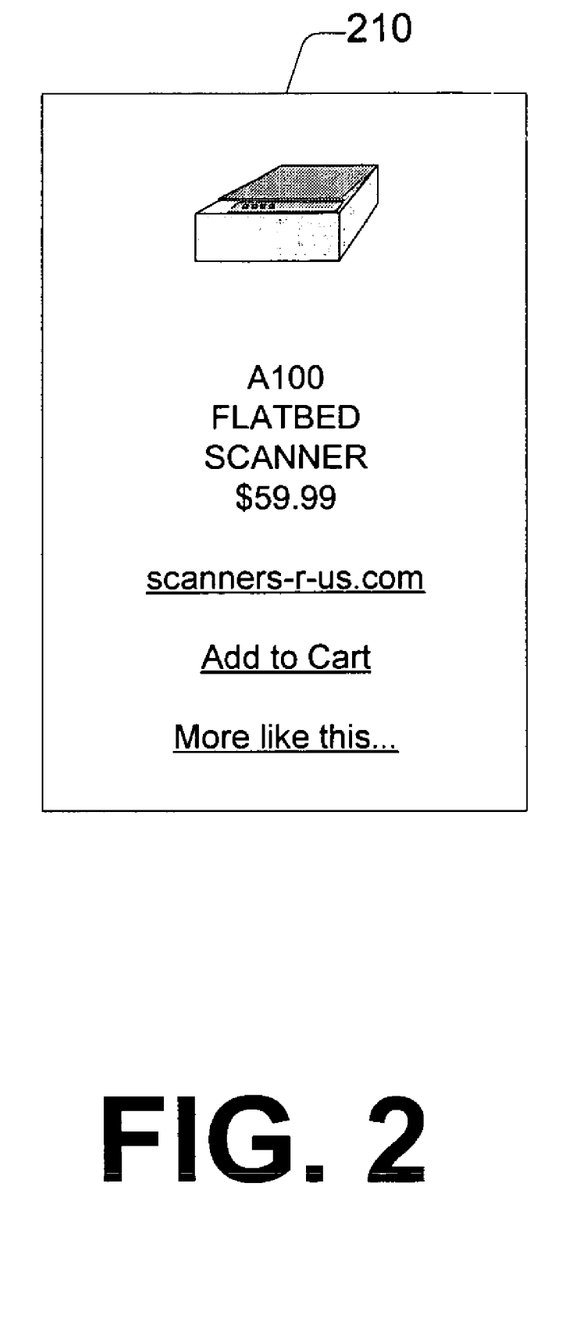
FIG. 2 shows an exemplary display item.

FIG. 2 shows an exemplary display item that might occupy one of the display slots on the Web page 100 of FIG. 1. Again, by way of example only, this display item represents an offer for sale of a particular make of flatbed scanner device. This particular display item comprises both text and graphics. As mentioned above, in other contexts and environments, a display item may comprise any text, graphics, animations, videos, applets, controls, pictures, logos, photographs, images, and the like, or any combinations thereof.

Because the number of available display slots on a Web page is typically limited, in environments in which there are multiple sources of display items each desiring use of the limited number of available display slots, a problem arises with respect to how to allocate the available display slots among the different sources. For example, in the on-line merchandizing example illustrated in FIGS. 1 and 2, the total number of product offers (i.e., display items) from the different merchants (i.e., sources) in a given product category may be much greater than the number of available display slots on the Web page 100. Additionally, some merchants may have a much greater number of product offerings in a given product category than other merchants. A process that merely randomly selects display items from the pool of all display items until the display slots on a page are filled will result in unfair treatment of smaller sources, as the likelihood of a given source's display items being selected for display will be greater for those sources that have the most display items.

Figure 3:
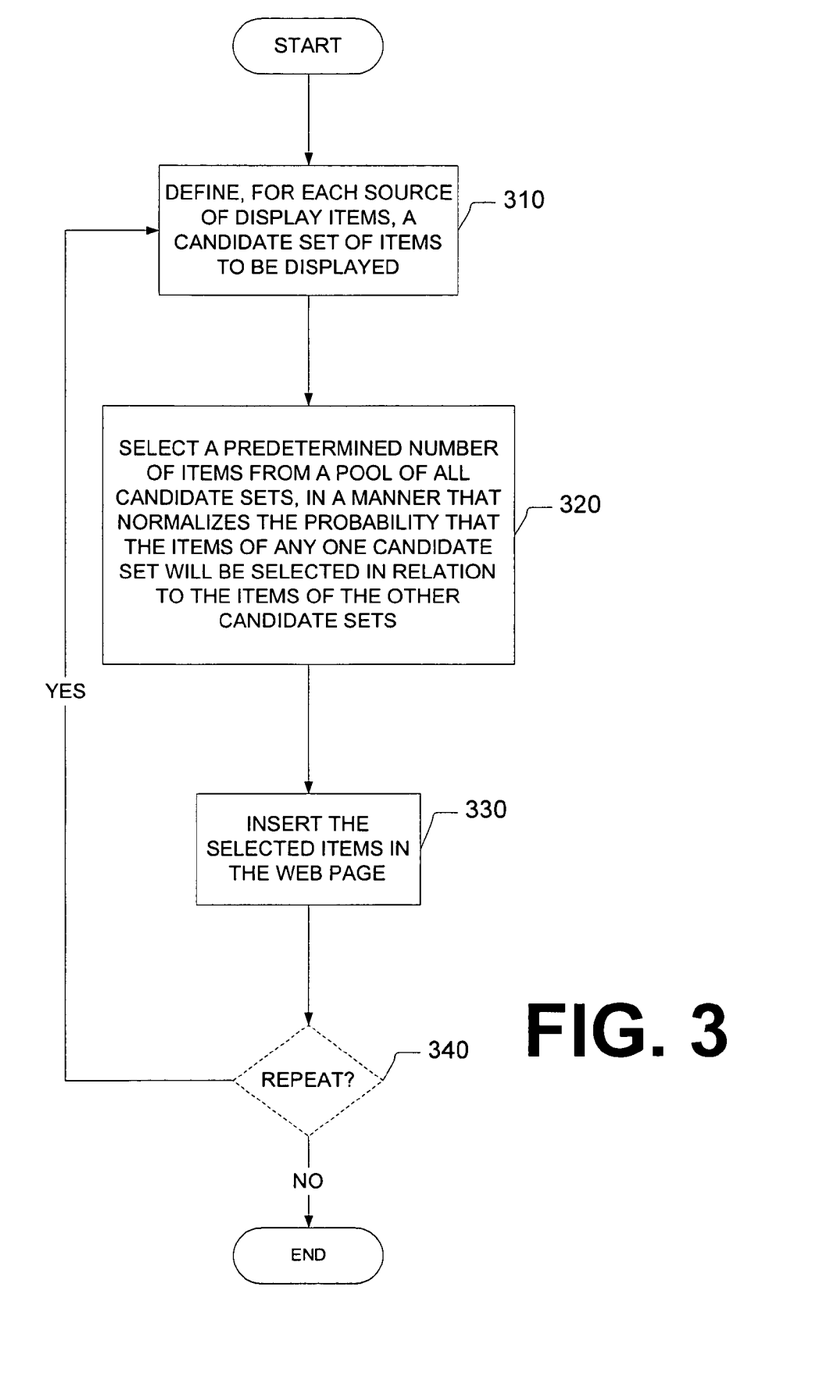
FIG. 3 is a flow diagram illustrating the method of the present invention.

FIG. 3 is a flow diagram of a method of the present invention that produces a more balanced allocation of available display slots on a page among a plurality of different sources of display items, by normalizing the probability that the offers from any given source will be selected for display on that page. More specifically, at step 310, for each of the different sources of display items, a candidate set of items to be displayed is defined. The candidate set of items may comprise all items of the source, or some smaller selection of items that the source wishes to be displayed. Next, at step 320, display items are selected from the pool of all candidate sets, in a manner that normalizes the probability that the items of any one candidate set will be selected in relation to the items of the other candidate sets. At step 330, the selected items are then inserted into the available display slots on the Web page. Depending upon the particular application, this method may be repeated to create a new mix of display items on the page, as illustrated by the optional step 340. As used herein and in the claims, the term "insert" is intended to encompass all means by which an item to be displayed on a Web page may be inserted into the code, template, file, or other data that defines a Web page, including, without limitation, direct insertion into HTML code or reference to the item via a tag, pointer, link, or the like.

Figure 4:
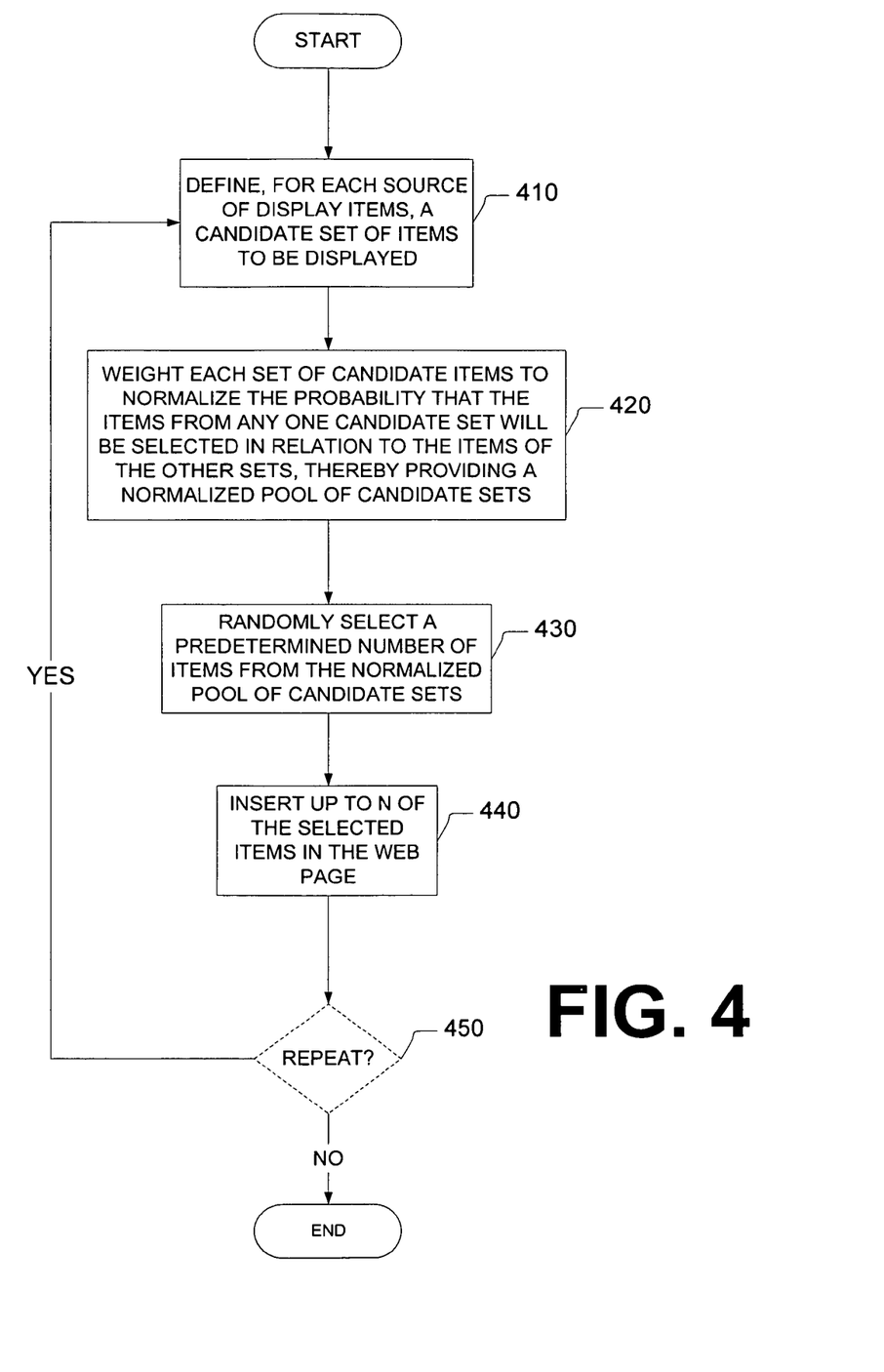
FIG. 4 is a flow diagram providing further details of one embodiment of the method of the present invention.

FIG. 4 is a flow diagram illustrating a more particular embodiment of the present invention. As shown, in step 410, a candidate set of items to be displayed is defined for each of the different sources of display items. Next, in step 420, the individual display items in each of the respective candidate sets is weighted to normalize the probability that the items from a given candidate set will be selected in relation to the items of the other candidate sets, thereby providing a normalized pool of candidate sets. In step 430, a predetermined number of display items are then randomly selected from the normalized pool of candidate sets. Assuming a Web page having a number N of available display slots, up to N of the selected items are then inserted into the available display slots on the page. As indicated by the optional step 450, this selection process may be repeated as many times as desired to create a new mix of display items on the Web page.

Figure 5:
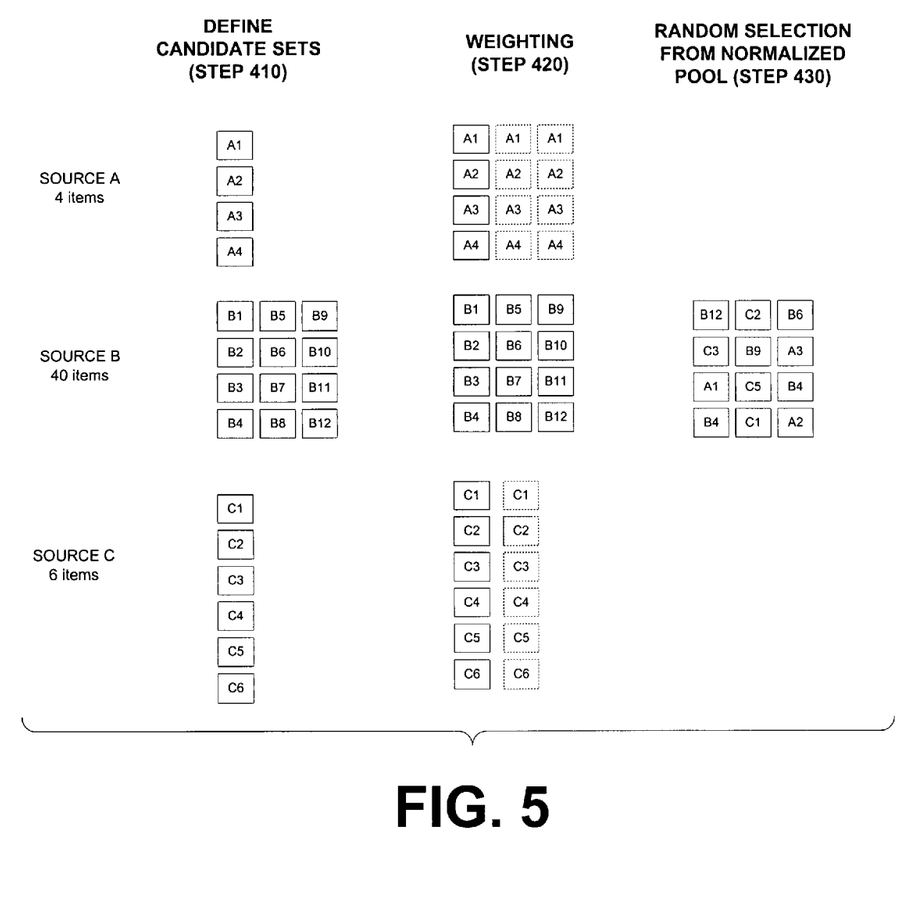
FIG. 5 graphically illustrates an exemplary application of the method of FIG. 4.

FIG. 5 graphically illustrates an exemplary application of the method of FIG. 4. In the example shown, there are three separate sources of display items—Source A, Source B, and Source C. In this example, Source A has four display items, Source B has forty display items, and Source C has six display items. As in the case of the exemplary Web page 100 of FIG. 1, assume that it is desired to fill (i.e., insert display items into) twelve available display slots on a Web page with display items from the various Sources A–C.

In accordance with step 410 of the method of FIG. 4, an attempt is made to define a set of twelve candidate items for each source (i.e., the same number as available slots on the Web page). In the case of Sources A and C, which both have fewer than twelve display items, the respective sets of candidate items will contain all of the display items of that source. Thus, the candidate set of display items for Source A contains items A1–A4, and the candidate set of display items for Source C contains items C1–C6. In the case of Source B, twelve candidate items are randomly selected from its forty display items to create a candidate set having twelve display items, B1–B12. Selecting a smaller number of items to define each set, such as a number equal to the number of available display slots on the Web page, effectively minimizes any large differences in the number of display items among different sources (e.g., 4 items versus 40 items). Nevertheless, as an alternative, the candidate set for each source may if desired contain the entire number of display items of that source. In that case, the candidate set for Source B would contain all forty of its display items.

The heading "Weighting" of FIG. 5 illustrates the performance of step 420 of the method of the present invention. As shown, each item in each candidate set is weighted to normalize the probability that an item of a given candidate set will be selected in relation to the items of the other candidate sets. For example, each item in the candidate set for Source A has been weighted by a factor of three, each item in the candidate set for Source B by a factor of 1, and each item in the candidate set for Source C by a factor of 2. The result is a normalized pool of candidate sets in which the probability that an item will be selected from one of the candidate sets is substantially the same for all candidate sets. For example, because each of the four items A1–A4 of the candidate set of Source A effectively appears in the normalized pool three times, it is just as likely during a random selection from the normalized pool that an item from the candidate set for Source A will be selected as it is that an item from the candidate set for Source B will be selected. Note, however, that while a weighted item, such as item A1, may effectively appear multiple times in the normalized pool, it can only be selected once. For example, once item A1 is selected, all instances of A1 are removed from the normalized pool.

As shown in step 430, once the normalized pool of candidate sets has been created, twelve display items are then randomly selected from the normalized pool. Those twelve display items may then be used to fill the twelve display slots on the Web page. In other examples, more or less than twelve display items may be selected as desired. Some algorithm may then be applied to assign the selected items to the available display slots on the page.

Figure 6:
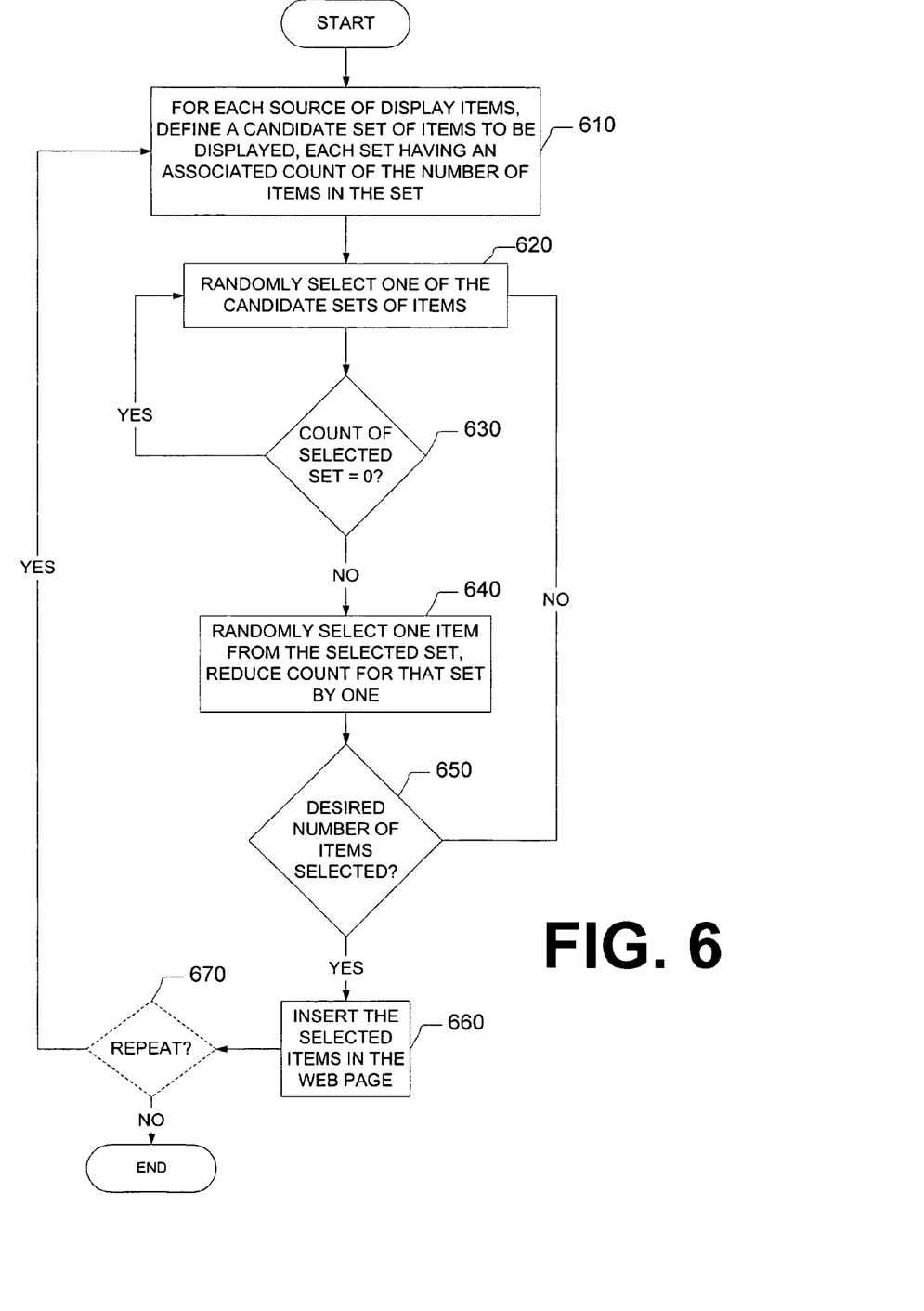
FIG. 6 is a flow diagram providing further details of another embodiment of the method of the present invention.

FIG. 6 is a flow diagram providing details of another embodiment of the method of the present invention. As shown, in step 610, a candidate set of display items is defined for each source of display items. In addition, a count is established of the number of display items in each candidate set.

Figure 7:
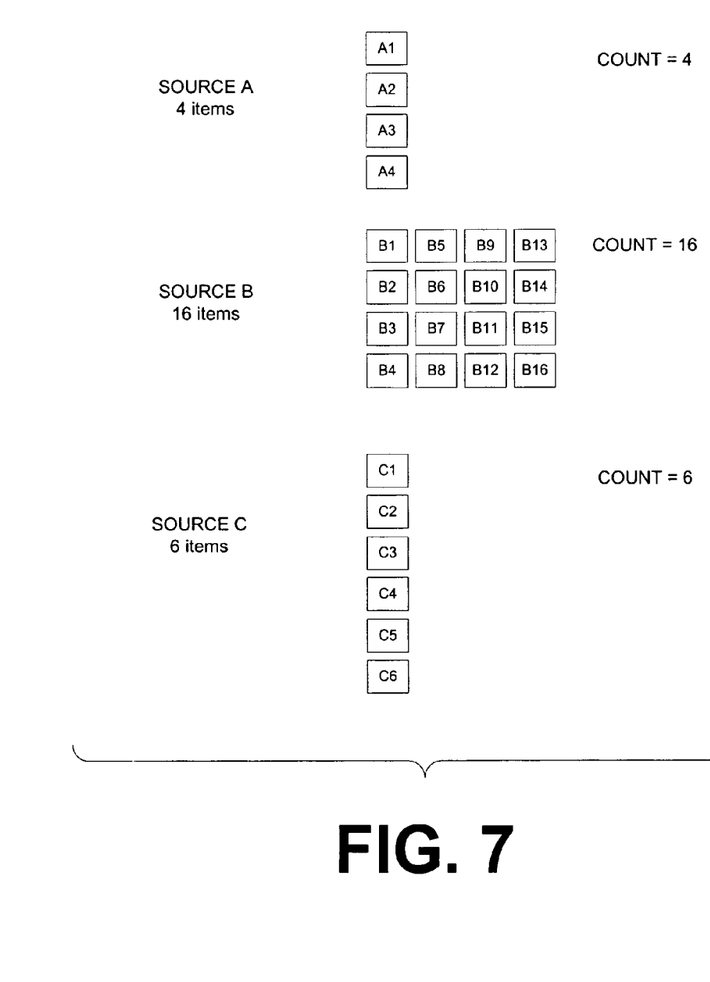
FIG. 7 graphically illustrates an exemplary application of the method of FIG. 6.

FIG. 7 illustrates the definition of candidate sets for each of three different sources —Source A, Source B, and Source C—in accordance with step 610 of FIG. 6. In this example, each candidate set of display items contains all of the display items in, for example, a particular category, for each respective source. In other examples, a lesser number of display items can be used to define each candidate set. As shown, each set has an associated count of the number of display items in that set.

Referring again to FIG. 6, in step 620, one of the candidate sets of display items is randomly selected. In step 630, a determination is made whether there are any more display items in that set (i.e., whether the count is equal to zero). If the set is empty, control passes back to step 620 and another candidate set is randomly selected. Thus, when the count for a given candidate set reaches zero, that set is effectively removed from further consideration.

If in step 630, the count of the selected set is greater than zero, then in step 640, a single display item is randomly selected and removed from that candidate set once selected. In step 650, the count for that set is then accordingly reduced by one and the element removed from consideration in the future.

Steps 620 through 640 will then be repeated until a desired number of display items have been selected, as is determined in step 650. Once the desired number of items have been selected, those items can be inserted into the available display slots on the Web page, as shown at step 660. Again, this process may optionally be repeated (step 670), as desired, to create a new mix of display items on the page either on demand or at a periodic interval.

Figure 8:
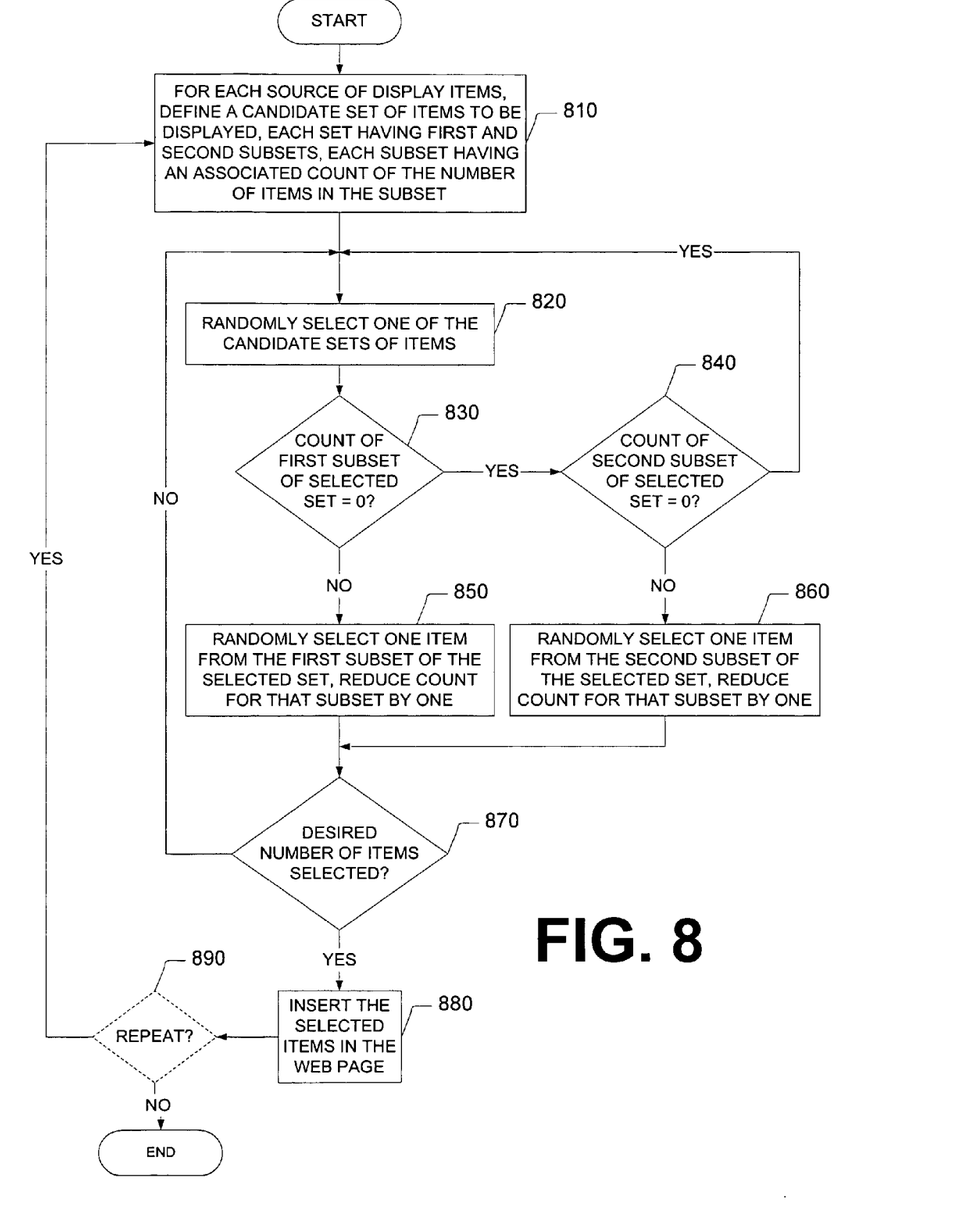
FIG. 8 is a flow diagram providing further details of yet another embodiment of the method of the present invention.

FIG. 8 is a block diagram illustrating yet another embodiment of the method of the present invention, which is a variation of the embodiment illustrated in FIG. 6. This embodiment differs from the embodiment illustrated in FIG. 6 in that it permits at least first and second subsets of display items to be defined within each candidate set, wherein the selection of items from one of the subsets takes precedence over the other subset. This capability enables each source of display items to treat certain of its display items differently than others. For example, in the on-line merchandizing example discussed above, in which each source is a merchant and each display item represents a product offer from that merchant, this capability can be used by a merchant to designate certain of its product offers as "specials", and to ensure that they will be treated preferentially in the selection process. Essentially, the definition of subsets is a way in which a merchant or other source of display items can effectively weight the selection process within its own candidate set to favor certain of its items over others, as described more fully below.

Figure 9:
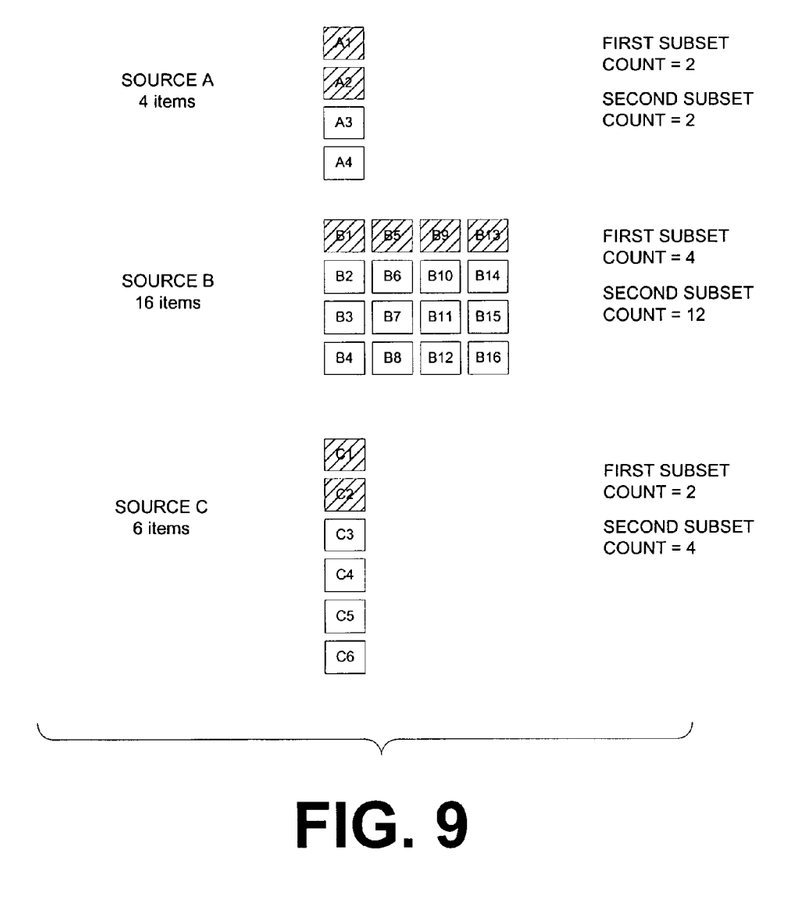
FIG. 9 graphically illustrates an exemplary application of the method of FIG. 8.

FIG. 9 graphically illustrates the definition of candidate sets having first and second subsets defined within them in accordance with step 810 of the method of FIG. 8. In the diagram, the display items in the first subset of each candidate set are shaded. As shown, each subset has its own associated count of the number of display items in that subset.

Referring again to FIG. 8, in step 820, one of the candidate sets of display items is randomly selected. Next, in step 830, the count of the first subset of display items of the selected set is examined to determine whether there are any display items in the first subset. If so, then that subset is given preference, and in step 850, one display item is selected and removed from the first subset. The count associated with the first subset is then accordingly reduced by one.

If in step 830, it is instead determined that the count associated with the first subset is zero (i.e., the first subset is empty), then control passes to step 840 where the count of the second subset is examined. If the count associated with the second subset is greater than zero, then in step 860, one display item is randomly selected and removed from the second subset and its count is accordingly reduced by one. If both the first and second subsets are determined to be empty (i.e., both counts are equal to zero), then control passes from step 840 back to step 820 where one of the candidate sets is again randomly selected. Thus, if both subsets are empty, the candidate set is effectively removed from further consideration.

Once a display item has been selected either from the first subset (step 850) or the second subset (step 860), control passes to step 870. Steps 820 through 860 are then repeated until the desired number of display items have been selected. When the selection of the items is completed, they may be inserted into the available display slots on the Web page (step 880). Again, the entire process may optionally be repeated (step 890), as desired, to create a new mix of display items on the Web page.

In an on-line merchandizing application, in which different merchants (i.e., sources) wish to display their product offers (i.e., display items) in the available display slots of a Web page (e.g., Web page 100 of FIG. 1), this embodiment of the method of the present invention enables the merchants to provide "special" offers by placing those offers in the first subset of their respective candidate set, and all other offers in the second subset. During the selection process, the "special" offers in the first subset will always be selected first. The offers in the second subset will only be selected after the offers in the first subset have all been previously selected. A merchant that does not have any "specials" during a given selection cycle can simply leave the first subset empty. This is a powerful capability in the context of on-line merchandising.

While this embodiment of the present invention is illustrated in FIG. 8 in the context of candidate sets that have two subsets, i.e., the first and second subsets described above, it is understood that the present invention is by no means limited thereto. Rather, the embodiment illustrated in FIG. 8 can be extended to any number S of subsets of display items, wherein display items are selected from each successive subset as the preceding subsets become empty. The number of different subsets will simply depend on the number of different unique values or "weights" that the particular source of display items (e.g., a merchant) wishes to establish within its respective candidate set. Moreover, while the weighting is effectively achieved above by use of subsets, the weighting of item selection within a given candidate set can be implemented in other ways. In other embodiments, other methods of weighting the selection of display items within the candidate set of a given source can be used, such as, for example, the weighting technique described above in connection with the method illustrated in FIG. 4 (step 420).

According to another feature of the present invention, the method of the present invention can be implemented in an environment in which there are different levels of source participation, wherein sources at higher levels are given preference over sources at lower levels in terms of allocation of display slots. By way of example, consider again the on-line merchandising environment discussed above, wherein merchants (i.e., sources) desire to display product offers (i.e., display items) on a Web page (e.g., Web page 100) of an on-line merchandising Web site. According to this feature of the present invention, each merchant can choose one of a number of different levels of participation.

By way of example, consider an on-line merchandising Web site that provides three levels of participation designated "Premier," "Anchor," and "Tenant," respectively. Participation as a "Premier" merchant provides the most preferential treatment and participation as a "Tenant" the least. Entry by a merchant into a given participation level can be based on a payment level ("Premier" participation being the most expensive), or it could be based on other factors such as the volume of transactions conducted by the merchant where each transaction generates revenue for the Web site; merchants that achieve the most transactions generate the most income for the Web site and are entitled to a higher level of participation.

In this environment, the embodiments of the present invention described above can be used to perform the selection of display items separately for each level of participation. That is, the methods described above are used to select some number of display items at each level of participation. This results, for example, in a number of display items from the merchants at the Premier level, a number of display items from the merchants at the Anchor level, and a number of display items from the merchants at the Tenant level. Further according to this aspect of the present invention, the available display slots on the Web page can then be allocated amongst the different levels in a manner that gives preferential treatment to the higher levels. For example, the higher levels may be allocated display slots closer to the top of the Web page, which generally is more preferable. Alternatively, the higher levels may be allocated more of the display slots than the lower levels. Other forms of preferential treatment are also possible.

Figure 10A:
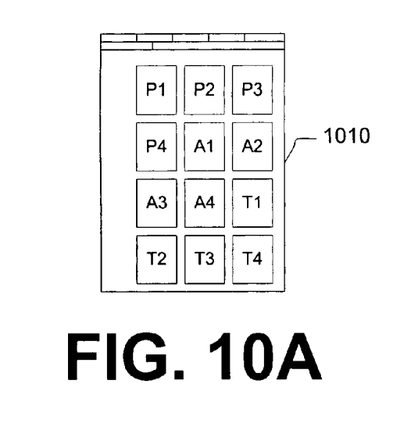
FIGS. 10A–10E illustrate further aspects of the method of the present invention.

FIG. 10A graphically illustrates how this aspect of the present invention may be applied in the on-line merchandising environment described above in which there are three levels of source participation—Premier, Anchor, and Tenant. In this example, the Web page 1010 on which items are displayed has twelve available display slots. The methods described above are employed separately at each level to select a number of display items from each level. In this example, twelve display items are selected from each level, i.e., the same number as available display slots. In other applications and examples, however, the number selected at each level may be greater than or less than the number of available display slots. According to this aspect of the present invention, a predetermined number of display items (in this case four) are then randomly selected from the set of twelve items selected at each level, and those display items are then inserted into the display slots of the Web page in the manner illustrated in FIG. 10A. In this example, the four display items from the Premier level (P1–P4) are given the upper most four display slots of the Web page, followed by the four display items selected from the Anchor level (A1–A4), followed by the four items selected from the Tenant level. Thus, the most desirable slots are allocated to the highest level (Premier) and the least desirable slots are allocated to the lowest level (Tenant).

Figure 10B:
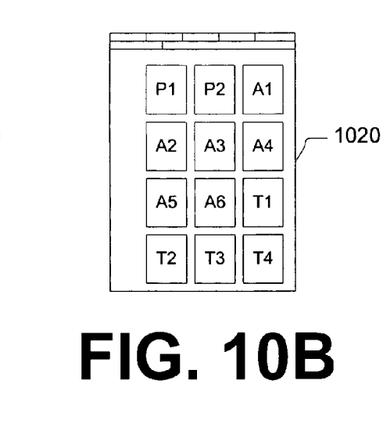
Figure 10C:
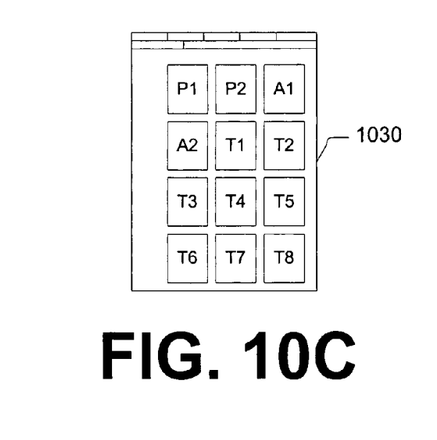
Figure 10D:
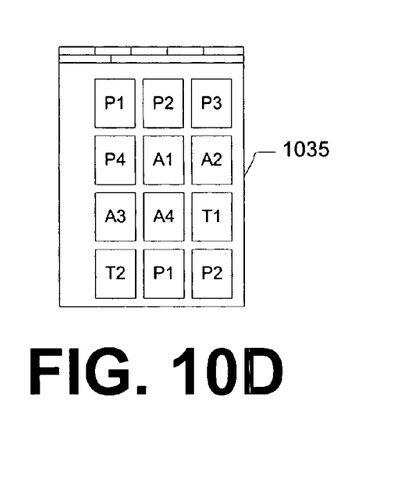

Further according to the present invention, in the event that there are not enough display items generated at a given level to fill the number of display slots normally allocated to that level, the unfilled display slots at that level are filled with display items from the next highest level. This aspect of the present invention is illustrated in FIGS. 10B, 10C, and 10D. In FIG. 10B, for example, only two display items were generated at the Premier level, and thus there are not enough Premier level items to fill the four display slots normally allocated to the Premier level. According to the present invention, therefore, the unfilled slots are filled instead by available display items at the Anchor level, i.e., the next highest level. Similarly, in FIG. 10C, only two display items were generated at both the Premier and Anchor levels, and thus the remaining display slots are filled with display items from the Tenant level. In FIG. 10D, there were enough items at the Premier and Anchor levels to fill the slots normally allocated to those levels, but not enough at the Tenant level to fill those slots. Consequently, the last two slots normally allocated to the Tenant level are filled instead with items from the highest of the other available levels, in this case the Premier level (items P5 and P6).

Figure 10E:
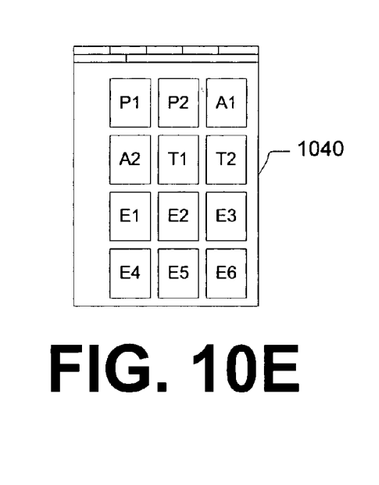

FIG. 10E illustrates yet another possibility where there are not enough display items generated at any of the levels to fill all of the available display slots on the Web page. According to a further aspect of the present invention, in this event, the unfilled display slots are instead allocated to display items (E1–E6) selected from sources outside of the current three levels. For example, in the context of an on-line merchandizing Web site, the Web page 1040 may have been intended to display a series of product offers (i.e., display items) for the product category "Scanners," which may be a subcategory of "Electronics." According to the present invention, in the event that there are not enough product offers for scanners from merchants at the Premier, Anchor, and Tenant levels of that subcategory, the remaining slots (E1–E6) can be filled instead with product offers selected from either other merchants, another subcategory of "Electronics," such as, for example, "Printers", or the remaining slots can be filled with product offers randomly selected from all the subcategories within the category of "Electronics." These other offers might be from sources at an established participation level, or they may be from sources that have not paid for or otherwise been assigned to any of the participation levels.

While the foregoing aspects of the present invention have been illustrated in the context of an environment that provides three levels of source participation, it is understood that these techniques may be extended to a fewer or greater number of levels, as desired. Also, while a Web page having twelve display slots has been used for purposes of illustration herein, it is understood that the present invention is by no means limited to that number of display slots, but rather can be employed in connection with a Web page of any number of available display slots.

Although not required, the methods of the present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 11:
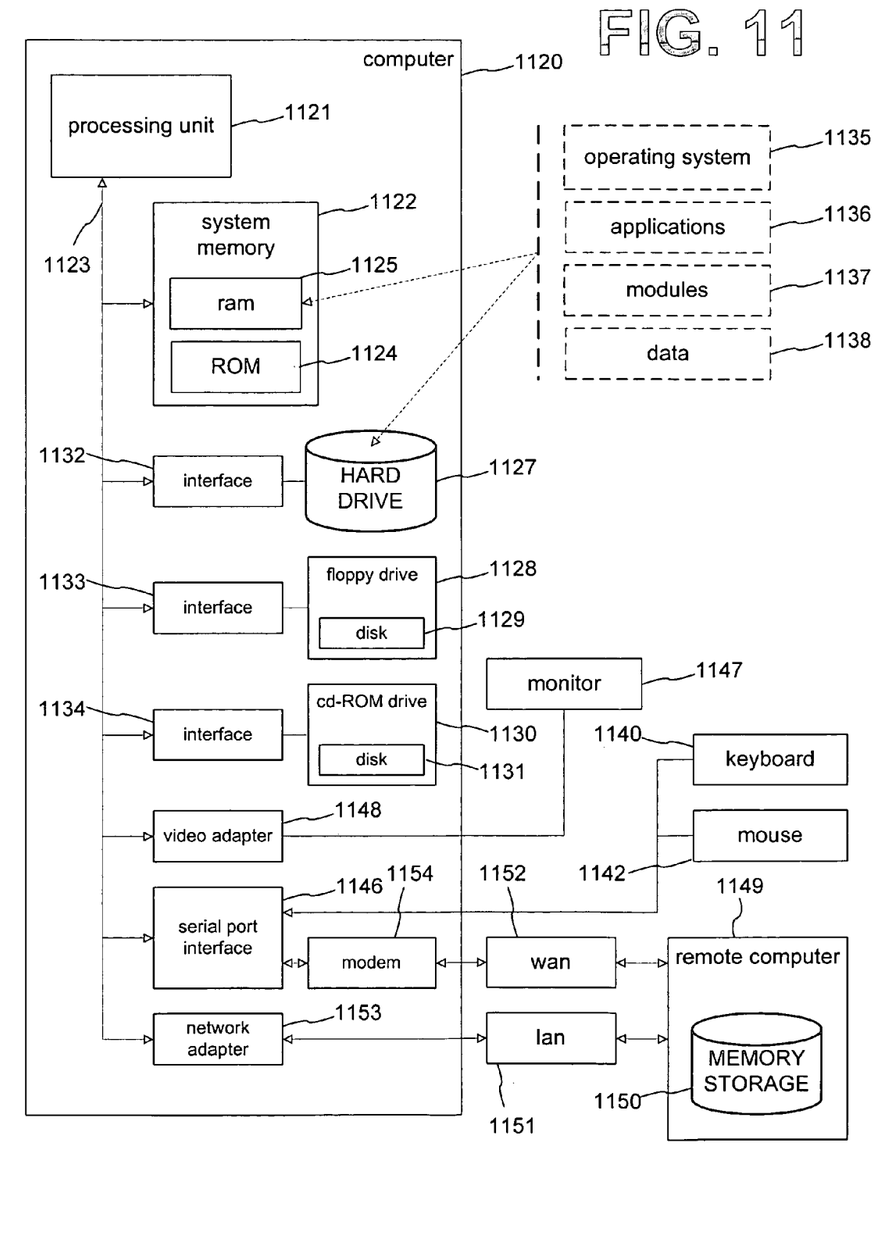
FIG. 11 illustrates an exemplary computer system in which the present invention can be implemented.

FIG. 11 illustrates an exemplary computing environment in which the program code that embodies the methods of the present invention may be executed. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program code and program modules comprising program code may be located in both local and remote memory storage devices.

With reference to FIG. 11, an exemplary system for implementing the invention includes a general purpose computing device in the form of a conventional computer 1120, including a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that helps to transfer information between elements within the computer 1120, such as during start-up, is stored in ROM 1124. The computer 1120 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120. Although the exemplary environment described herein employs a hard disk, a removable magnetic disk 1129 and a removable optical disk 1131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 1129, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 11. The logical connections depicted in FIG. 11 include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

As the foregoing illustrates, the present invention is directed to methods for balancing the allocation of available display slots on a page among a plurality of different sources of display items. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method of allocating a number N of available display slots on a Web page among a plurality of different sources of display items, said method comprising:

(a) defining, for each source of display items, a candidate set of items to be displayed;

(b) selecting display items from a pool of all candidate sets of display items in a manner that equalizes a probability that display items of a first candidate set from a first source are selected in relation to display items of a second candidate set from a second source, wherein the display items of the first candidate set and the second candidate set are unequal in number;

(c) inserting up to N of the selected items in the available display slots of the Web page;

(d) defining a plurality of different levels of source participation, each source being associated with one level and each level having one or more sources associated with it;

(e) performing (a) through (c) separately for the sources at each level of participation, thereby selecting a number of display items at each level; and (f) selecting a predefined number of display items from said selected items at each level and assigning the predefined number of display items of each level to respective display slots on the Web page in a manner that gives preference to one level of source participation relative to another.

2. The method recited in claim 1, wherein if there are not enough display items at a given level to select said predefined number of display items, then said method further comprises assigning display slots that otherwise would have been assigned to the display items of that level instead to the display items at the highest other level of participation having available items to fill those slots.

3. The method recited in claim 1, wherein if there are not enough display items among all of the levels of source participation to fill the available display slots on the Web page, then said method further comprises filling the unfilled display slots with display items selected from sources outside of said predefined levels of source participation.

4. The method recited in claim 1, wherein (b) further comprises (b1) randomly selecting one of the candidate sets, (b2) selecting one item from the selected candidate set, (b3) reducing a count of the display items of the selected candidate set by one and removing that candidate set from further consideration when the count reaches zero; and (b4) repeating (b1) through (b3) until a desired number of display items have been selected.

5. The method recited in claim 4, wherein (b2) comprises randomly selecting one item from the selected candidate set.

6. The method recited in claim 4, wherein (b2) comprises selecting one item from the selected candidate set in accordance with a weighting of items applied to the selected candidate set.

7. The method recited in claim 6, wherein (a) comprises defining, for each source of display items, a candidate set of items to be displayed, each candidate set of items having at least a first subset and a second subset, each subset having a count associated therewith of the number of display items in that subset, and wherein (b2) and (b3) are performed first on the first subset of display items until the count for that subset reaches zero, and then on the second subset, the candidate set being removed from further consideration only after the counts of both subsets reach zero.

8. The method recited in claim 7, wherein each candidate set comprises two or more subsets, and wherein (b2) and (b3) are performed, in turn, on each successive subset until the counts of all of the subsets reach zero.

9. A computer-readable medium having computer-executable instructions which when executed by a computer cause the computer to allocate a number N of available display slots on a Web page among a plurality of different sources of display items, said instructions causing the computer to:
(a) define, for each source of display items, a candidate set of items to be displayed;
(b) selecting display items from a pool of all candidate sets of display items in a manner that equalizes a probability that display items of a first candidate set from a first source are selected in relation to display items of a second candidate set from a second source, wherein the display items of the first candidate set and the second candidate set are unequal in number;
(c) insert up to N of the selected items in the available display slots of the Web page;
(d) define a plurality of different levels of source participation, each source being associated with one level and each level having one or more sources associated with it;
(e) perform (a) through (c) separately for the sources at each level of participation, thereby selecting a number of display items at each level; and
(f) select a predefined number of display items from said selected items at each level and assigning those selected display items to respective display slots on the Web page in a manner that gives preference to one level of source participation relative to another.

10. The computer-readable medium recited in claim 9, wherein if there are not enough display items at a given level to select said predefined number of display items, then said instructions further cause the computer to assign display slots that otherwise would have been assigned to the display items of that level instead to the display items at the highest other level of participation having available items to fill those slots.

11. The computer-readable medium recited in claim 9, wherein if there are not enough display items among all of the levels of source participation to fill the available display slots on the Web page, then said instructions further cause the computer to fill the unfilled display slots with display items selected from sources outside of said predefined levels of source participation.

12. The computer-readable medium recited in claim 9, wherein (b) further comprises (b1) randomly selecting one of the candidate sets, (b2) selecting one item from the selected candidate set, (b3) reducing a count of the display items of the selected candidate set by one and removing that candidate set from further consideration when the count reaches zero; and (b4) repeating (b1) through (b3) until a desired number of display items have been selected.

13. The computer-readable medium recited in claim 12, wherein (b2) comprises randomly selecting one item from the selected candidate set.

14. The computer-readable medium recited in claim 12, wherein (b2) comprises selecting one item from the selected candidate set in accordance with a weighting of items applied to the selected candidate set.

15. The computer-readable medium recited in claim 14, wherein (a) comprises defining, for each source of display items, a candidate set of items to be displayed, each candidate set of items having at least a first subset and a second subset, each subset having a count associated therewith of the number of display items in that subset, and wherein (b2) and (b3) are performed first on the first subset of display items until the count for that subset reaches zero, and then on the second subset, the candidate set being removed from further consideration only after the counts of both subsets reach zero.

16. The computer-readable medium recited in claim 15, wherein each candidate set comprises two or more subsets, and wherein (b2) and (b3) are performed, in turn, on each successive subset until the counts of all of the subsets of that set reach zero.

17. A method of generating a Web page having a number of display items from different sources located in at least some of N available display slots of the Web page:
(a) defining, for each source of display items, a candidate set of items to be displayed;
(b) selecting display items from a pool of all candidate sets of display items in a manner that equalizes a probability that display items of a first candidate set from a first source are selected in relation to display items of a second candidate set from a second source, wherein the display items of the first candidate set and the second candidate set are unequal in number;
(c) inserting up to N of the selected items in the available display slots on the Web page;
(d) defining a plurality of different levels of source participation, each source being associated with one level and each level having one or more sources associated with it;
(e) performing (a) through (c) separately for the sources at each level of participation, thereby selecting a number of display items at each level; and
(f) selecting a predefined number of display items from said selected items at each level and assigning the predefined number of display items of each level to respective display slots on the Web page in a manner that gives preference to one level of source participation relative to another.

18. The method recited in claim 17, wherein if there are not enough display items at a given level to select said predefined number of display items, the method of generating the Web page further comprises assigning display slots that otherwise would have been assigned to the display items of that level instead to the display items at the highest other level of participation having available items to fill those slots.

19. The method recited in claim 17, wherein if there are not enough display items among all of the levels of source participation to fill the available display slots on the Web page, the method of generating the Web page further comprises filling the unfilled display slots with display items selected from sources outside of said predefined levels of source participation.

20. The method recited in claim 17, wherein (b) further comprises (b1) randomly selecting one of the candidate sets, (b2) selecting one item from the selected candidate set, (b3) reducing a count of the display items of the selected candidate set by one and removing that candidate set from further consideration when the count reaches zero; and (b4) repeating (b1) through (b3) until a desired number of display items have been selected.

21. The method recited in claim 20, wherein (b2) comprises randomly selecting one item from the selected candidate set.

22. The method recited in claim 20, wherein (b2) comprises selecting one item from the selected candidate set in accordance with a weighting of items applied to the selected candidate set.

23. The method recited in claim 22, wherein (a) comprises defining, for each source of display items, a candidate set of items to be displayed, each candidate set of items having at least a first subset and a second subset, each subset having a count associated therewith of the number of display items in that subset, and wherein (b2) and (b3) are performed first on the first subset of display items until the count for that subset reaches zero, and then on the second subset, the candidate set being removed from further consideration only after the counts of both subsets reach zero.

24. The method recited in claim 23, wherein each candidate set comprises two or more subsets, and wherein (b2) and (b3) are performed, in turn, on each successive subset until the counts of all of the subsets reach zero.

* * * * *